United States Patent
Kodama et al.

(10) Patent No.: US 7,377,545 B2
(45) Date of Patent: May 27, 2008

(54) MICRO GAS GENERATOR WITH AUTOMATIC IGNITION FUNCTION

(75) Inventors: Ryoi Kodama, Himeji (JP); Kazumasa Kurita, Himeji (JP); Kenjiro Ikeda, Himeji (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 201 days.

(21) Appl. No.: 10/524,751

(22) PCT Filed: Aug. 29, 2003

(86) PCT No.: PCT/JP03/11089

§ 371 (c)(1),
(2), (4) Date: Mar. 28, 2005

(87) PCT Pub. No.: WO2004/025210

PCT Pub. Date: Mar. 25, 2004

(65) Prior Publication Data
US 2006/0162607 A1    Jul. 27, 2006

(30) Foreign Application Priority Data
Aug. 30, 2002 (JP) .............................. 2002-252835

(51) Int. Cl.
B60R 21/26 (2006.01)
(52) U.S. Cl. ..................................................... 280/736
(58) Field of Classification Search ................ 280/736, 280/737, 740, 741
See application file for complete search history.

(56) References Cited

U.S. PATENT DOCUMENTS

| 5,290,060 A | 3/1994 | Smith .......................... 280/737 |
| 5,380,380 A | 1/1995 | Poole et al. ................... 149/22 |
| 5,834,679 A | 11/1998 | Seeger |

FOREIGN PATENT DOCUMENTS

| JP | 6-206513 | 7/1994 |
| JP | 7-232613 | 9/1995 |
| JP | 7-232989 | 9/1995 |
| JP | 8-508972 | 9/1996 |
| JP | 9-169254 | 6/1997 |
| JP | 2001-80986 | 3/2001 |
| JP | 2001-225711 | 8/2001 |

OTHER PUBLICATIONS

Copy of Chinese communication dated Aug. 24, 2007 (3-pages), with English Translation (4-Pages).

*Primary Examiner*—Faye M. Fleming
(74) *Attorney, Agent, or Firm*—Nields & Lemack

(57) ABSTRACT

A micro gas generator with an automatic ignition function operated before being weakened by heat without impairing the cleanliness of exhaust gas, comprising gas generating agent, a cup body for filling the gas generating agent therein, and a holder formed integrally with squibs and fixedly sealing the squibs in the cup body, wherein an automatic igniting agent layer is put on the inner surface of the cup body.

8 Claims, 4 Drawing Sheets

MICRO GAS GENERATOR WITH AUTOMATIC IGNITION FUNCTION

TECHNICAL FIELD

The present invention relates to a gas generator, in particular, a micro gas generator which has an automatic ignition property suitable for activating automobile safety members such as a seatbelt pretensioner.

BACKGROUND ART

Seatbelt pretensioners are known as one of the safety apparatuses for protecting occupants from impact in the event of collision of an automobile. Such seatbelt pretensioners are equipped with a micro gas generator which is activated by high temperature, high pressure gas generated from the gas generator in the collision, and take up the seatbelt slightly to protect the occupant. Application of such micro gas generator used for seatbelt pretensioners have been extended recently and for example, the generator is becoming widely used for activation of devices which reduces damage to the human body by suppressing forward movement of the occupant by instantly bouncing up the front end of the seat slightly in the collision, or which reduces damage to pedestrians by instantly bouncing up the hood slightly to create a gap between the hood and the engine in the collision with the pedestrian.

The micro gas generator used for such purposes comprises an aluminum cup body for filling a gas generating agent therein, a squib which ignites the gas generating agent and a holder for fixedly sealing the squib in the cup body, and is also called a micro gas generator.

For the gas generating agent used in the micro gas generator, an agent which generates a large amount of gas and has an ignition temperature lower than the brittle temperature of aluminum which is the material of the cup body has been used.

With increased awareness of environment and health in recent years, however, a gas generating agent which generates a large amount of gas and exhausts cleaner gas has been demanded. Such gas generating agent has a high ignition temperature of not lower than 300° C. (see U.S. Pat. No. 6,136,114).

When a micro gas generator using a gas generating agent having such a high ignition temperature is exposed to high temperature by fire on vehicles, embrittlement of the safety system and destruction by activation of the micro gas generator are expected to be caused.

On the other hand, for airbag inflators which are typical gas generators to cope with high temperature caused by fire on vehicles, one in which the strength of the housing is increased by thickening the board of the housing to prevent housing from exploding, one in which an agent which ignites automatically at a relatively low temperature (hereinafter referred to as "automatic igniting agent") is put at a suitable position in the housing to make the gas generating agent burn under the temperature condition where the housing can stand the high pressure of the combustion gas (see Japanese Patent Application Laying Open (KOKAI) No. 2001-225711) and one in which an automatic igniting agent is formed into a film and placed so as to contact with both the inner surface of the housing and the gas generating agent (see Japanese Patent Application Laying Open (KOKAI) No. 9-328052) have been known.

These methods, however, have a defect of complicated structure and increased cost because of some structural installation inside the gas generator. In particular, since micro gas generators used for seatbelt pretensioners have a smaller amount of gas generating agent than airbag inflators, the amount of the automatic igniting agent to carry out the automatic igniting function is relatively increased, possibly affecting the combustion property.

An object of the present invention is to improve such defect and to develop a micro gas generator which has an automatic ignition function and activates before embrittlement of the cup body by heat even in a small amount without loss of the cleanliness of exhaust gas and the combustion property of the gas generating agent. The present inventors have conducted intensive studies to solve the above problems and have found that a gas generator which surely ignites automatically even with a reduced amount of automatic igniting agent can be obtained by forming an automatic igniting agent layer on the inner surface of a combustion chamber for the gas generating agent.

DISCLOSURE OF THE INVENTION

Accordingly, the present invention relates to:

(1) A gas generator comprising a gas generating agent, a cup body for filling the gas generating agent therein, and a holder with a squib, fixedly sealing the squib in the cup body, wherein an automatic igniting agent layer is provided on the inner surface of the cup body;

(2) The gas generator according to (1), wherein the weight of the automatic igniting agent layer is at least 3 mg;

(3) The gas generator according to (1) or (2), wherein the automatic igniting agent layer is formed by applying a solution containing an automatic igniting agent on the inner surface of the cup body and then drying;

(4) The gas generator according to any of (1) to (3), wherein an automatic igniting agent layer is provided on the inner surface of a combustion chamber for the gas generating agent and wherein the weight of the automatic igniting agent layer is at least 4 mg;

(5) The gas generator according to any of (1) to (4), wherein the automatic igniting agent layer is in contact with the gas generating agent;

(6) The gas generator according to any of (1) to (5), wherein the ignition temperature of the automatic igniting agent is not lower than 150° C. and lower than the ignition temperature of the gas generating agent;

(7) The gas generator according to any of (1) to (5), wherein the ignition temperature of the automatic igniting agent is 150 to 250° C.;

(8) The gas generator according to any of (1) to (7), wherein the weight of the automatic igniting agent layer is 3 mg to less than 10 mg;

(9) The gas generator according to any of (1) to (8), wherein a filter material, a transfer charge or a coolant is not used; and

(10) The gas generator according to any of (1) to (9), wherein the gas generating agent is used in an amount of 300 mg to 2000 mg.

BEST MODE FOR CARRYING OUT THE INVENTION

The gas generator of the present invention has an automatic igniting agent layer on the inner surface of the combustion chamber for the gas generating agent. More specifically, the gas generator comprises, for example, a gas generating agent, a cup body for filling the gas generating agent therein and a holder formed integrally with a squib and fixedly sealing the squib in the cup body, wherein an automatic igniting agent layer is provided on the inner surface of the cup body. The combustion chamber for the gas generating agent corresponds to the inner space of the cup body. It is not required that the gas generating agent is completely burned in the combustion chamber, but it may be sufficient that the gas generating agent starts burning in the chamber. The automatic igniting agent layer can be formed without any particular limitation as long as it is formed on the inner surface of the combustion chamber for the gas generating agent. The layer may be formed, for example, on the inner surface of the cup body, more specifically at the bottom or on the side of the inner surface thereof, or both. In addition, the holder may be prepared by integral forming with the squib or after preparing the holder and the squib separately, they may be integrated by caulking or other means. The squib refers to an ignition member which makes the gas generating agent ignited by a collision signal.

Figure 1:
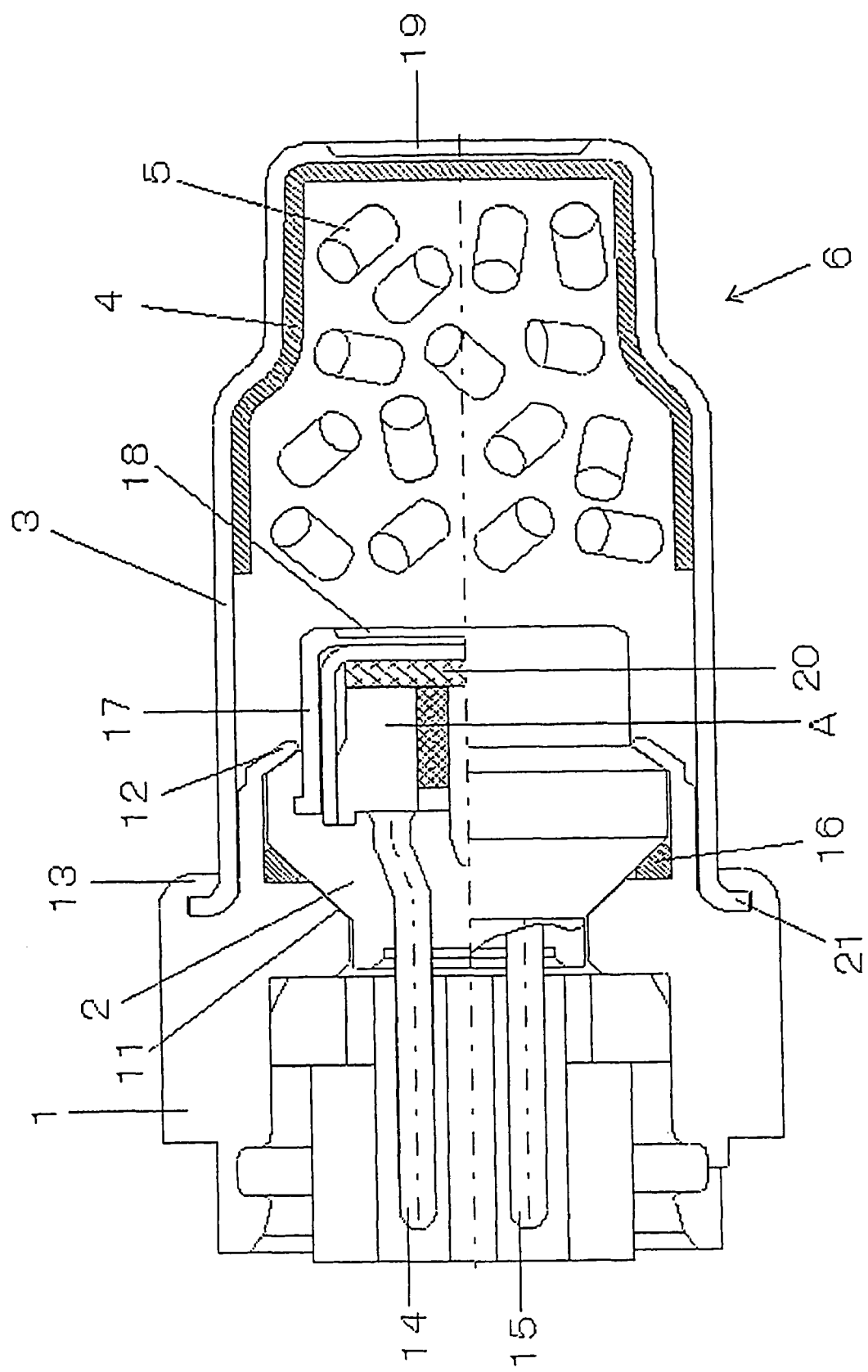
FIG. 1 is a cross-sectional view of an embodiment of the gas generator of the present invention.

FIG. 1 shows an example of the gas generator of the present invention. Reference numeral 1 denotes a holder, reference numeral 2 denotes a squib, reference numeral 3 denotes a cup body, reference numeral 4 denotes an automatic igniting agent layer and reference numeral 5 denotes a gas generating agent. In this example, the automatic igniting agent layer is formed at the bottom and on the side of the inner surface of the cup body. In addition, the holder 1 and the squib 2 are prepared separately and integrated by caulking.

The holder 1 has a dish-like taper part 11 which is for inserting and setting the plug A of the squib 2, a projection 12 for setting the plug A of the squib 2 and a projection 13 for setting the cup body 3. For the holder 1, resins such as polybutylene terephthalate, polyethylene terephthalate, nylon 6, nylon 66, polyphenylene sulfide, polyphenylene oxide, polyethylene imide, polyether imide, polyether ether ketone and polyether sulfone, or one in which glass fiber or carbon is added thereto are molded by injecting into a mold which is abbreviated in the figure. In addition, conductive pins 14 and 15 are put integrally on the holder 1. Each of the conductive pins 14 and 15 is integrated with the resin of the holder 1 by putting them inside the mold when the resin is injected into the above mold.

The squib 2 include two conductive pins 14 and 15 which are installed for supplying electricity to ignite ignition agent 20, and a plug A. For the squib used in the present invention, glass squib which seals the plug A by the glass or a fused head squib with a plug A made of resin is preferably used.

The material of the conductive pins 14 and 15 is preferably an alloy containing nickel, iron and stainless steel. The material of the plug A includes, for example, polybutylene terephthalate, polyethylene terephthalate, nylon 6 and nylon 66.

In addition, regarding the holder 1, a sealing member 16 such as O-ring is disposed between the squib 2 and the plug A when holding the plug A of the squib 2 to keep away moisture between the squib 2 and the holder 1. The material of the sealing member 16 is not particularly limited but those difficult to permeate water such as nitrile, silicon and ethylene propylene rubber are preferable. It is preferable that the sealing member 16 is installed over the entire periphery of the jointed part of the holder and the squib.

The cup body 3 has cylindrical shape with a bottom and has a plurality of linear notches 19 at the bottom. The notches 19 are cracked upon the combustion of the gas generating agent 5 stored in the cup body 3 and the gas is directly released into the seatbelt pretensioner which is not shown in the figure. Flange part 21 is formed extending outward to the radial direction at the open end of the cup body 3 and assembled to the holder 1 by caulking by projection 13 formed on the holder 1. Examples of the material of the cup body 3 include metals such as stainless steel, iron and aluminum.

The automatic igniting agent layer is an agent layer which has a characteristic of being ignited automatically at a certain temperature, and is preferably in contact with the gas generating agent. The certain temperature refers to, for example, not lower than 150° C. and lower than the ignition temperature of the gas generating agent, preferably 150° C. to 250° C., which is lower than the brittle temperature of the cup body. The ignition temperature is measured by using a Krupp ignition point tester.

The weight of the automatic igniting agent is at least 3 mg, preferably at least 4 mg and at least 5 mg is sufficient, and it is preferably not more than 100 mg, more preferably not more than 50 mg and further preferably not more than 20 mg. In practice, the weight is 3 to 10 mg in view of the stability over time of the gas generating agent, and preferably about 5 to 10 mg or 5 to less than 10 mg is sufficient in view of the flammability for the gas generating agent. The determination of the weight is calculated from the difference between the weight of the cup body before forming an automatic igniting agent and the weight of the cup body after forming the composition layer, or the difference between the weight of the cup body after forming the composition layer and the weight of the cup body after removing the composition layer.

For forming the automatic igniting agent layer on the inner surface of the combustion chamber for the gas generating agent, for example, an automatic igniting agent and, where necessary, additives as exemplified below are dissolved or suspended in a solvent or a medium, followed by application on the inner surface of the cup body and drying. Specifically, the solution or the suspension is dropped on the cup body and dried as it is, or dried after centrifugal application. Alternatively, after injecting the solution or the suspension into the cup body and removing extra liquid by a method such as suction, drying may be conducted. That is, all or part of the inner surface of the cup body may be moistened by the solution or the suspension and then dried. The concentration of the automatic igniting agent to be dissolved or suspended in the solvent or the medium is preferably adjusted to 2 to 40% by weight. It is desired that the concentration of the solution is adjusted to preferably 5 to 30% by weight, more preferably 10 to 20% by weight.

Examples of the automatic igniting agent for forming an automatic igniting agent layer include smokeless powder and nitrocellulose such as celluloid, and as a composition, one comprising saccharose, potassium chlorate or magnesium oxide, one in which silicone or urethane is added thereto (see Japanese Patent Application Laying Open (KOKAI) No. 7-232989), one comprising dextrin, potassium chlorate, zinc oxide or butyl rubber (see the above publication), a composition containing a hydrazine salt of 3-nitro-1,2,4-triazole-5-one and an oxidant (National Publication of International Patent Application No. 8-508972) and a composition containing 5-aminotetrazole, potassium nitrate or molybdenum trioxide. When these automatic igniting agents are used as a suspension, the particle size is preferably not more than 50 μm, more preferably not more than 20 μm. In addition, for improved adhesion, additives such as a binder may be added within the range that has no substantial influence on the ignition property.

As the solvent or the medium for producing a solution or a suspension of the automatic igniting agent, those having a moderate volatility are preferable. Examples thereof include alcohols such as methanol, ethanol and butanol, ketones such as acetone, ethyl methyl ketone, isobutyl methyl ketone, diacetone alcohol and cyclohexanone, acetic acid esters such as methyl acetate, ethyl acetate, propyl acetate, butyl acetate, amyl acetate and isoamyl acetate, ethers such as ethyl lactate, DMF (dimethylformamide), diethyl ether, cellosolve, butyl cellosolve and dioxane. The solvent or the medium is used alone or in a mixture of two ore more kinds.

In the example shown in FIG. 1, the gas generating agent 5 is filled in direct contact with the inner circumference of the cup body 3 without a filter material and/or a coolant. The gas generating agent to be used contains a fuel component, an oxidant component and additives, and it is desired that these components have an excellent heat resistance. In addition, it is desired to control the oxygen balance to make the combustion gas clean. Examples of the fuel component include at least one member selected from the group consisting of 5-aminotetrazole, guanidine nitrate, nitroguanidine and pentaerythritol. Examples of the oxidant component include at least one member selected from the group consisting of strontium nitrate, ammonium nitrate, potassium nitrate, ammonium perchlorate and potassium perchlorate. Examples of the additives include metal oxides such as copper oxide, iron oxide and molybdenum trioxide, basic metal carbonates or basic metal nitrates as a combustion catalyst. In addition, examples of other additives that can be added to the gas generating agent include binders including polysaccharide derivatives such as methylcellulose, hydroxyethyl methylcellulose, hydroxypropyl methylcellulose, hydroxyethyl cellulose, cellulose acetate, cellulose propionate, cellulose acetate butyrate, nitrocellulose, microcrystalline cellulose, carboxymethyl cellulose, water-soluble cellulose ether, polyvinyl alcohol, guar gum and starch, organic binders such as polyacrylic amide and polyvinylpyrrolidone and inorganic binders such as molybdenum disulfide, acid clay, talc, bentonite, diatomaceous earth, kaolin, silica, alumina and synthesized hydrotalcite. A preferred gas generating agent contains 5-aminotetrazole and guanidine nitrate or nitroguanidine as fuel components, strontium nitrate and ammonium perchlorate as oxidant components, metal oxides such as copper oxide and iron oxide, basic metal carbonates such as basic copper carbonate, basic cobalt carbonate, basic zinc carbonate, basic iron carbonate and basic manganese carbonate, or basic nitrates such as basic copper nitrate, basic cobalt nitrate, basic zinc nitrate, basic iron nitrate and basic manganese nitrate as a combustion catalyst, and hydroxypropyl methylcellulose and polyacrylic amide as binders. A more preferred gas generating agent contains 0 to 30% by weight of 5-aminotetrazole and 10 to 45% by weight of guanidine nitrate or 30 to 50% by weight of nitroguanidine as fuel components, 15 to 35% by weight of strontium nitrate and 15 to 35% by weight of ammonium perchlorate as oxidant components, copper oxide as a combustion catalyst and 1 to 10% by weight of a binder. In the gas generator of the present invention, the gas generating agent is used in the range of preferably 50 mg to 2000 mg, more preferably 300 mg to 2000 mg.

The gas generating agent used in the present invention may be formed into, for example, a molded article having a desired shape so as to be put in a seatbelt pretensioner. The shape of the molded article is not particularly limited and after adding water or an organic solvent to the gas generating agent depending on the types and amounts of (a) fuel, (b) oxidant, (c) binder and (d) combustion control agent, the solution is mixed until homogeneous and the resultant is kneaded, extrusion molded and cut into a column-shaped or cylindrical molded article or formed into pellet molded articles using a tableting machine.

When conducting press molding, an anticaking agent is first added to the fuel component and the oxidant, and after mixing separately in V-mixers, pulverization is conducted. The pulverized fuel component, the pulverized oxidant, a molding auxiliary agent and a combustion control agent are weighed in pre-determined amounts and mixed in a V-mixer homogeneously. Then, the mixture is introduced to a press molding machine and subjected to a heat treatment. The obtained molded article is used as a gas generating agent.

When conducting extrusion molding, the fuel component and the oxidant are pulverized, the pulverized fuel component, the pulverized oxidant, a molding auxiliary agent and a combustion control agent are weighed in pre-determined amounts and mixed in a V-mixer homogeneously in the same manner. To the mixed agent is added 8 to 25% by weight in outer percentage of water or an organic solvent and by kneading sufficiently, a viscous wet agent is prepared. Then, the agent is extrusion molded to a desired shape using a vacuum kneading extruder, cut accordingly and subjected to a heat treatment. The extrusion molded article obtained in this way is used as a gas generating agent composition.

For the gas generator 6 of the present invention, it is preferable that at least a filter material, a transfer charge or a coolant is not used, it is more preferable that a filter material and a transfer charge, a filter material and a coolant, or a transfer charge and a coolant are not used, and it is particularly preferable that none of filter material, transfer charge or coolant is used.

The gas generator 6 of the present invention is preferably used as a gas generator for seatbelt pretensioners or anti-submarine devices (restraint system for forward movement of automobile occupant).

The gas generator 6 of the present invention constituted as described above can be prepared according to the following procedures. First, conductive pins 14 and 15 of the squib 2 are inserted into the holder 1 and the squib 2 is mounted so as to be inserted into the taper part 11 of the holder 1 via a sealing member 16. Then, by fitting the fitting projection 12 to cover the surface of the squib 2, squib 2 is integrally mounted on the holder 1. Next, the cup body 3 filled with the gas generating agent 5 is fitted to the holder 1 to which the squib 2 is mounted and fixed by caulking via a fitting projection 13.

The activation of the gas generator 6 of the present invention is described in the following. Upon detection of automobile collision by a collision sensor which is not shown in the figure, electricity runs through the conductive pins 14 and 15 installed on the squib 2 to ignite an ignition agent 20. Subsequently, due to the ignition of the ignition agent 20, the gas generating agent 5 is ignited and burnt to discharge gas. As the ignition agent 20 burns, the temperature and the pressure inside the squib 2 become high. The gas and particles with increased temperature and pressure due to further combustion are released into the squib case 17. In other words, due to combustion, the temperature and the pressure inside the squib case 17 become even higher. At this stage, the high temperature, high pressure gas is spouted at a blast to gas generating agent 5 inside the cup body 3 through the ignition hole 18 of the squib case 17 with the burning gas generating agent. Since the squib case 17 is fixed to the holder 1 by fitting, it will not be blown to the direction of the gas generating agent 5. Then, a large amount of gas generated in the cup body 3 due to the combustion of the gas generating agent 5 rapidly increases the inner pressure of the cup body 3 and finally the notch 19 formed at the bottom of the cup body 3 is cracked, and the gas is introduced into the seatbelt pretensioner (not shown) to activate the seatbelt pretensioner.

EXAMPLE

In the following, the gas generator of the present invention is explained in detail by means of Examples, but the gas generator of the present invention is not limited to the following Examples.

Example 1

Nitrocellulose was used as an automatic igniting agent. Nitrocellulose was dissolved in ethyl acetate and the solution was adjusted to a concentration of 15% by weight and directly injected into a cup body by a dispenser. By rotating the cup body at this time, the solution was applied to the entire inner surface to form a layer. Separately, one in which a layer is formed only at the bottom of a cup body was also prepared. The amount of the automatic igniting agent can be easily controlled by changing the injection amount. Next, they were put in a drier set to 60° C. to volatilize the medium (solvent) so as to attach the layer to the cup body completely. Then, these cup bodies having an automatic igniting agent layer were filled with a gas generating agent, and gas generators having a squib and a holder formed integrally with the squib and fixedly sealing the squib in the cup body were prepared and subjected to experiments.

Bonfire Test

Figure 2:
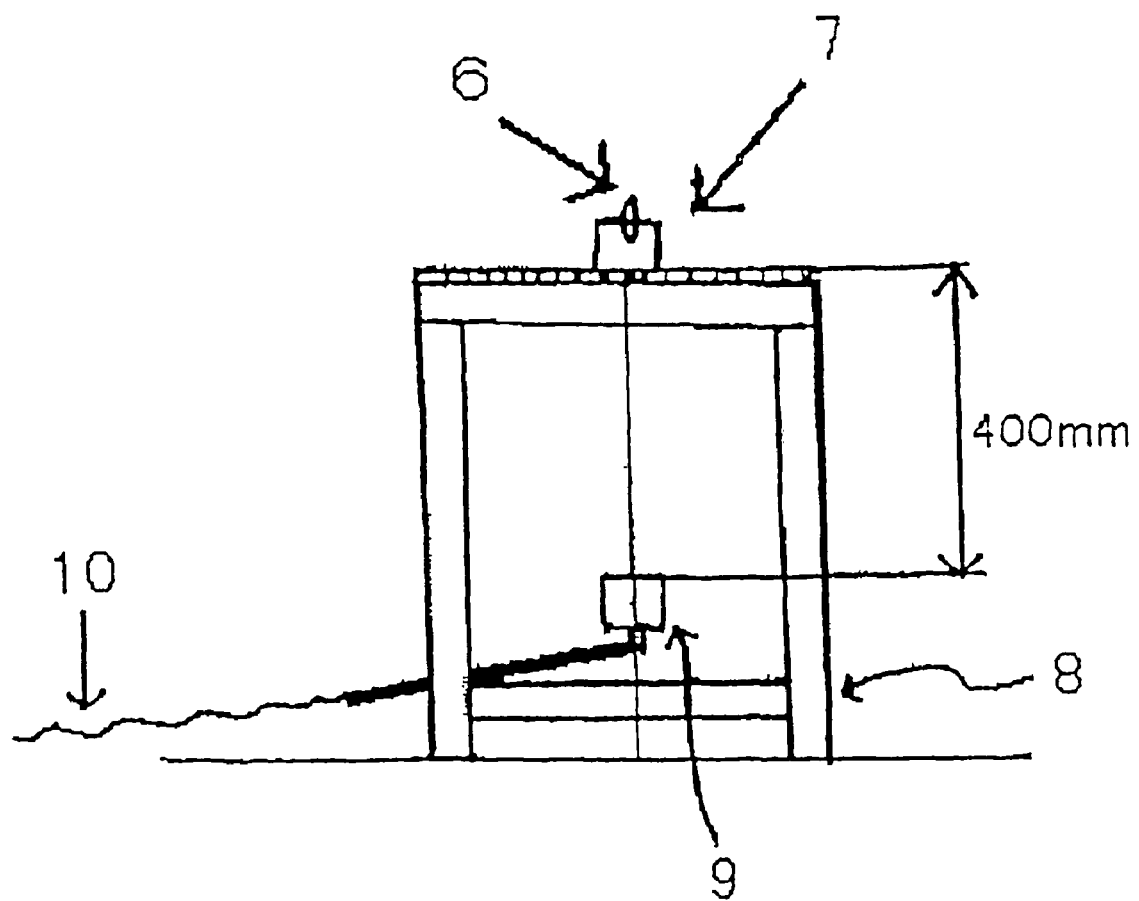
FIG. 2 is a schematic view of a bonfire tester.

For testing the automatic ignition property of the gas generator, a bonfire test was conducted using an apparatus as shown in FIG. 2. The prepared gas generator 6 was set on a 3.5 cc cylinder 7 (a bonfire test jig for setting gas generator) and fixed at the position 400 mm from the tip of a propane gas burner 9 (diameter 60 mm) and heated by the burner 9. The flame height of the burner 9 at this point was adjusted to 600 mm. The diameter of the gas discharging hole of the 3.5 cc cylinder 7 used was 1.0 mm and nitrocellulose was used as the automatic igniting agent. Gas generators equipped with a cup body having an automatic igniting agent layer of 5 mg to 46 mg were used. As the gas generating agent, a gas generating agent composition containing 7.2 parts by weight of 5-aminotetrazole and 29.2 parts by weight of guanidine nitrate as the fuel components, 29.8 parts by weight of strontium nitrate and 29.8 parts by weight of ammonium perchlorate as the oxidant components and 4.0 parts by weight of binder was used, and a sample containing 1800 mg of the gas generating agent was used. The time from firing to the catch of the sound was measured.

The measurement results of the bonfire test are shown in Table 1.

TABLE 1

| No. | Automatic igniting agent | Part applied | Amount of automatic igniting agent | Activation time |
|---|---|---|---|---|
| 1 | none | | — | 3 min 54 sec |
| 2 | none | | — | 3 min 58 sec |
| 3 | nitrocellulose applied | entire inner surface | 5.1 mg | 2 min 55 sec |
| 4 | nitrocellulose applied | only the bottom | 5.7 mg | 3 min 2 sec |
| 5 | nitrocellulose applied | entire inner surface | 14.9 mg | 2 min 54 sec |
| 6 | nitrocellulose applied | only the bottom | 13.0 mg | 2 min 59 sec |
| 7 | nitrocellulose applied | entire inner surface | 46.0 mg | 2 min 44 sec |
| 8 | nitrocellulose applied | only the bottom | 30.4 mg | 2 min 52 sec |

As is clear from the table 1, the activation time of the gas generator can be shortened with at least 5 mg of the automatic igniting agent.

Accelerated Test for Stability Over Time

Figure 3:
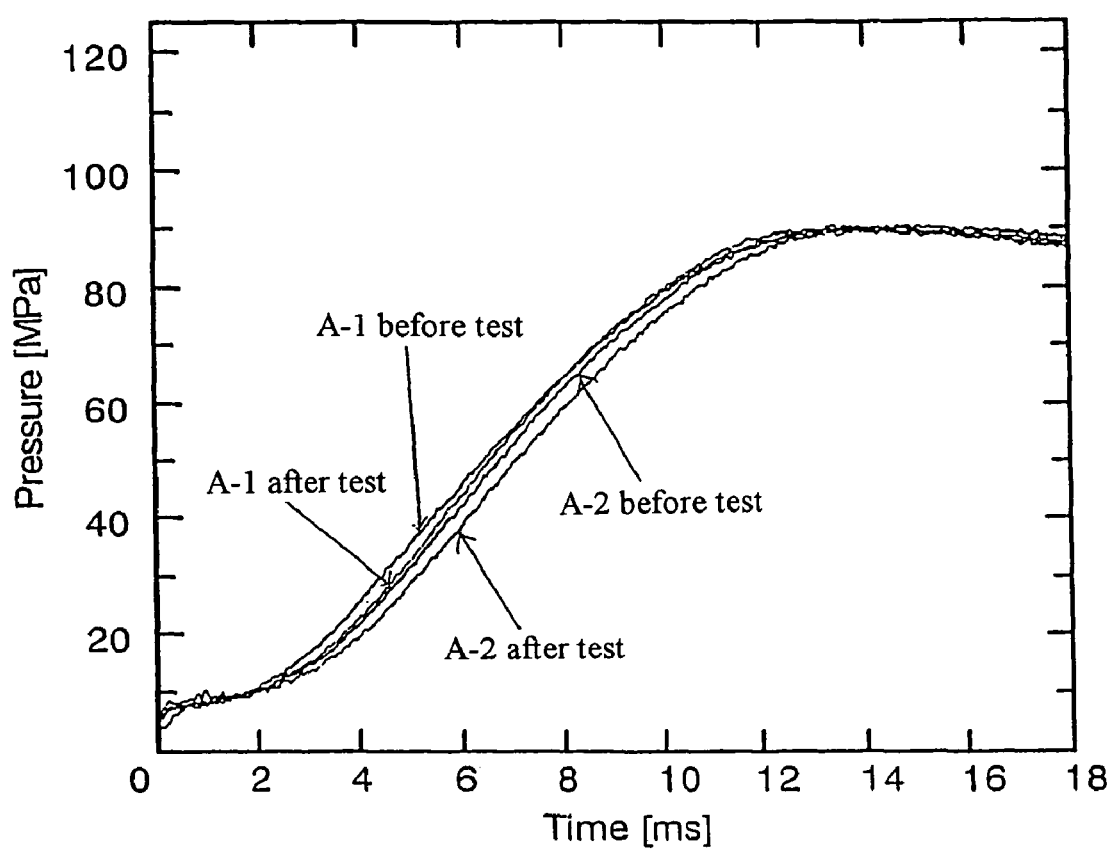
FIG. 3 is a view showing the relation between the pressure and the time in the accelerated test for stability over time of a gas generator to which 8 mg of an automatic igniting agent is applied.
Figure 4:
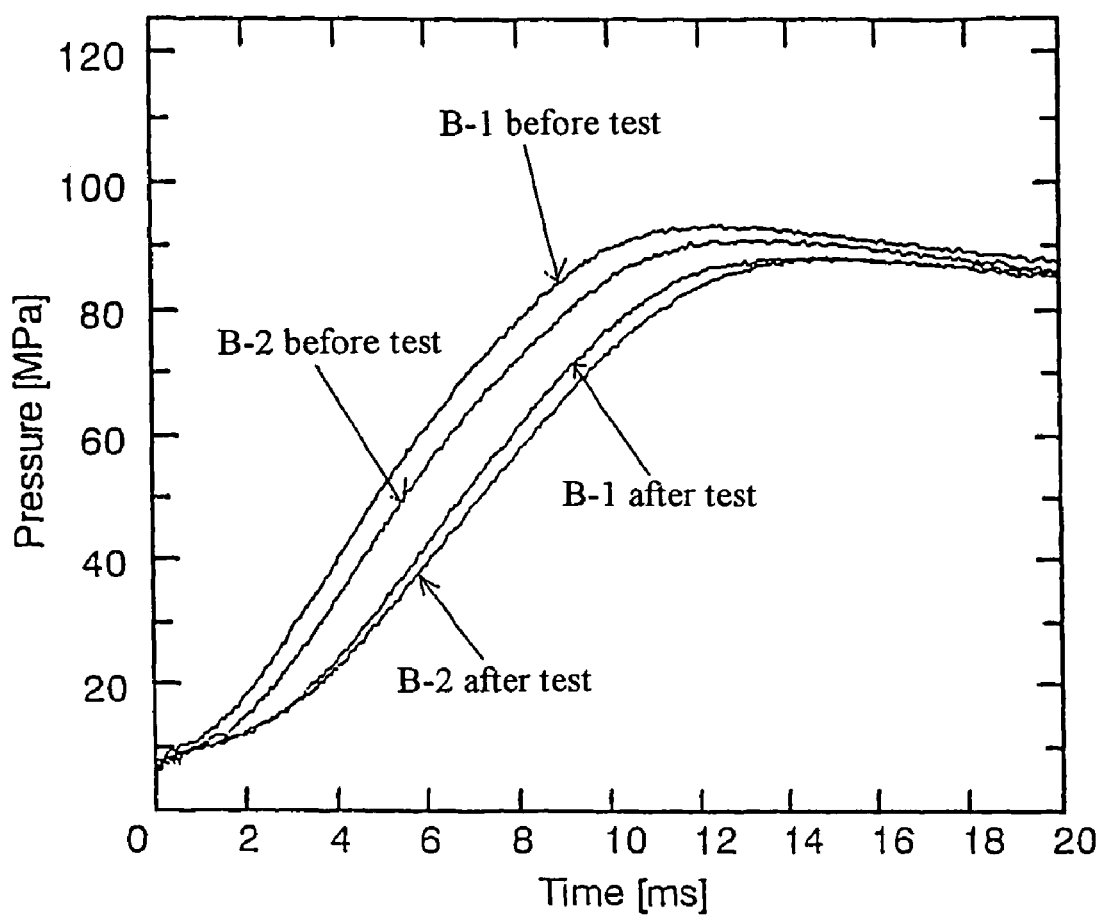
FIG. 4 is a view showing the relation between the pressure and the time in the accelerated test for stability over time of a gas generator to which 20 mg of an automatic igniting agent is applied.

An automatic igniting agent (nitrocellulose) in an amount of 8 mg (sample A; n=2) and 20 mg (sample B; n=2) was applied to the bottom of the inner surface of the cup body respectively, and using the cup bodies, micro gas generators (for seatbelt pretensioner) of the present invention were produced. The gas generators were subjected to an accelerated test for stability over time by exposing to the condition of 107° C. for 400 hr. The activation properties (gas generation behavior) by electricity flow of the gas generator before and after the test were investigated. The results are shown in FIG. 3, FIG. 4, Table 2 and Table 3.

TABLE 2

Results of accelerated test for stability over time
(8 mg automatic igniting agent applied)

| | 5% Peak | tPeak | Pmax |
|---|---|---|---|
| A-1 before test | 1.24 | 14.86 | 90.06 |
| A-1 after test | 1.22 | 15.18 | 90.26 |
| A-2 before test | 1.12 | 15.76 | 90.8 |
| A-2 after test | 1.76 | 15.4 | 90.82 |

TABLE 3

Results of accelerated test for stability over time
(20 mg automatic igniting agent applied)

| | 5% Peak | t Peak | P max |
|---|---|---|---|
| B-1 before test | 1.16 | 13.12 | 93.6 |
| B-1 after test | 1.36 | 16.88 | 88.35 |
| B-2 before test | 0.94 | 13.5 | 91.3 |
| B-2 after test | 1.56 | 16.48 | 88.73 |

In Table 2 and Table 3, 5% Peak indicates the time [ms] from the electricity flow to the point where the pressure increased by 5% assuming the maximum pressure to be 100%. tPeak indicates the time [ms] from the electricity flow to the point where the maximum pressure is reached and Pmax indicates the maximum pressure [MPa]. The 5% Peak time value is an index for the time from the electricity flow to the ignition of the gas generating agent.

As is clear from Table 2, when 8 mg of the automatic igniting agent is applied, sample A which was subjected to the accelerated test for stability over time has uneven 5% Peak time values compared to sample A which was not subjected to the accelerated test for stability over time, but the tPeak time values and the Pmax values remain almost the same, and there is no great difference between the two. This is also clear from the fact that there is no great difference in the pressure increase curves based on the gas generation relative to the lapse of time after the electricity flow, which are shown in FIG. 3, between the sample before the test and the sample after the test.

On the other hand, as is clear from Table 3, when 20 mg of the automatic igniting agent is applied, apparent delays can be found in the 5% Peak time values and the tPeak time values in sample B which was subjected to the accelerated test for stability over time compared to sample B which was not subjected to the accelerated test for stability over time, and the Pmax values are decreased and there is a great difference between the two. This is also clear from the fact that there is a great difference in the pressure increase curves based on the gas generation relative to the lapse of time after the electricity flow, which are shown in FIG. 4, between the sample before the test and the sample after the test.

In the accelerated test for stability over time, as is clear from the comparison between the case of applying 8 mg of the automatic igniting agent and the case of applying 20 mg of the automatic igniting agent, the sample in which the amount of the automatic igniting agent was limited has a smaller variation degree of the gas generation before and after the test than that of the sample having a large amount of automatic igniting agent. Accordingly, it is understood that the automatic igniting agent has a smaller impact on the gas generating agent.

The gas generating agent used in the test is the same as the gas generating agent used in the above bonfire test (composition and amount of each component).

The above test results suggest that the gas generator using 20 mg of automatic igniting agent is advantageous in that the automatic activation time of the gas generating agent at high temperatures can be shortened. However, the gas generator using 8 mg of the automatic igniting agent is superior in not only that point but also the stability over time. Accordingly, by limiting the amount of use of the automatic igniting agent, long term stability of the product is ensured when installed on an automobile.

INDUSTRIAL APPLICABILITY

According to the present invention, by forming an automatic igniting agent layer on the inner surface of the combustion chamber for the gas generating agent, the automatic activation time of the gas generator at high temperatures can be shortened even with an extremely small amount of the automatic igniting agent of a mg level. As a result, a micro gas generator with an automatic ignition function activated before embrittlement by heat without loss of the cleanliness of exhaust gas can be obtained. In addition, by limiting the amount of use of the automatic igniting agent, an automatic ignition micro gas generator having superior stability over time can be obtained.

The invention claimed is:

1. A gas generator comprising a gas generating agent, a cup body for filling the gas generating agent therein and a holder with a squib, fixedly sealing the squib in the cup body, wherein an automatic igniting agent layer is provided on the inner surface of the cup body and wherein the automatic igniting agent layer is formed by applying a solution containing the automatic igniting agent on the inner surface of the cup body and then drying, and wherein a filter material, a transfer charge or a coolant is not used.

2. The gas generator according to claim 1, wherein the weight of the automatic igniting agent layer is at least 3 mg.

3. The gas generator according to claim 1, wherein the automatic igniting agent layer is provided on the inner surface of a combustion chamber for the gas generating agent and wherein the weight of the automatic igniting agent layer is at least 4 mg.

4. The gas generator according to claim 3, wherein the automatic igniting agent layer is in contact with the gas generating agent.

5. The gas generator according to any one of claims 1, 2, 3, and 4, wherein the ignition temperature of the automatic igniting agent is not lower than 150° C. and lower than the ignition temperature of the gas generating agent.

6. The gas generator according to any one of claims 1, 2, 3, and 4, wherein the ignition temperature of the automatic igniting agent is 150 to 250° C.

7. The gas generator according to claim 6, wherein the weight of the automatic igniting agent layer is 3 mg to less than 10 mg.

8. The gas generator according to claim 1, wherein the gas generating agent is used in the range of 50 mg to 2000 mg.

* * * * *